(12) United States Patent
Nagaya et al.

(10) Patent No.: US 7,274,985 B2
(45) Date of Patent: Sep. 25, 2007

(54) TRACTION CONTROL DEVICE

(75) Inventors: Junya Nagaya, Kariya (JP); Toshihisa Kato, Handa (JP); Yasuhito Ishida, Anjo (JP); Tatsuya Yano, Toyoake (JP)

(73) Assignee: Advics Co., Ltd., Aichi-pref. (JP)

( * ) Notice: Subject to any disclaimer, the term of this patent is extended or adjusted under 35 U.S.C. 154(b) by 210 days.

(21) Appl. No.: 10/889,074

(22) Filed: Jul. 13, 2004

(65) Prior Publication Data
US 2005/0027427 A1 Feb. 3, 2005

(30) Foreign Application Priority Data
Jul. 30, 2003 (JP) ............................. 2003-282882

(51) Int. Cl.
*G06F 17/00* (2006.01)
*G06F 19/00* (2006.01)

(52) U.S. Cl. ........................... 701/82; 701/70; 701/71; 701/84; 701/90; 180/197; 303/112; 303/113.2

(58) Field of Classification Search ............ 701/70–74, 701/84; 303/112, 113.2, 139, 163–165, 177; 180/197, 201; 280/12.13
See application file for complete search history.

(56) References Cited

U.S. PATENT DOCUMENTS

| | | | | |
|---|---|---|---|---|
| 5,431,242 A | * | 7/1995 | Iwata et al. ................. | 180/197 |
| 5,539,643 A | * | 7/1996 | Yamamoto et al. ........... | 701/85 |
| 5,564,796 A | * | 10/1996 | Saito et al. .................. | 303/112 |
| 5,636,121 A | * | 6/1997 | Tsuyama et al. .............. | 701/70 |
| 5,644,488 A | * | 7/1997 | Ito et al. ........................ | 701/1 |
| 5,754,967 A | * | 5/1998 | Inoue et al. .................. | 701/54 |
| 5,957,991 A | * | 9/1999 | Yasuda ......................... | 701/84 |
| 5,978,726 A | * | 11/1999 | Takeda et al. ................ | 701/84 |
| 6,321,154 B1 | * | 11/2001 | Schmitt et al. ............... | 701/82 |
| 6,829,529 B2 | * | 12/2004 | Trefzer et al. ................ | 701/82 |

* cited by examiner

*Primary Examiner*—Jack Keith
*Assistant Examiner*—Chuong Nguyen
(74) *Attorney, Agent, or Firm*—Posz Law Group, PLC

(57) ABSTRACT

A target vehicle speed is switched between a target slip vehicle speed and a target torque vehicle speed on the basis of a result of a determination regarding whether or not a vehicle is insufficiently accelerated. More specifically, if traction control is not performed, the target slip vehicle speed is set as the target vehicle speed. If it is determined that the vehicle is sufficiently accelerated during traction control, a value obtained by subtracting a maximum permissible value from a value set last time as the target vehicle speed is compared with the target slip vehicle speed, and the larger one of them is set as the target vehicle speed this time. If it is determined that the vehicle is insufficiently accelerated during traction control, the larger one of the target slip vehicle speed and the target torque vehicle speed is compared with a value obtained by adding a maximum permissible value to a value set last time as the target vehicle speed, and the smaller one of them is set as the target vehicle speed this time.

1 Claim, 6 Drawing Sheets

TRACTION CONTROL DEVICE

CROSS REFERENCE TO RELATED APPLICATION

This application is based upon and claims the benefit of Japanese Patent Application No. 2003-282882 filed on Jul. 30, 2003, the content of which are incorporated herein by reference.

FIELD OF THE INVENTION

The invention relates to a traction control device that is capable of efficiently transmitting a torque generated by an engine (i.e., engine torque) as a driving force.

BACKGROUND OF THE INVENTION

Related art has been proposed such as a traction control device for a vehicle that is disclosed, for example, in Japanese Patent Application Laid-Open No. HEI 07-132761. The traction control device disclosed in this publication is provided with a differential for transmitting power from an automatic transmission to right and left driving wheels. This traction control device calculates a brake torque to be applied to the driving wheels by: detecting a torque input to the differential; calculating a critical drive torque based on an input torque at the time when excessive slipping of one of the driving wheels is detected; and subtracting this critical drive torque from a current input torque to obtain the brake torque.

In the traction control device of the related art, the brake torque to be applied to the driving wheels is set with high priority assigned to the suppression of wheel slip. Therefore, inefficient utilization of torque originally generated by the engine may sometimes make it impossible to obtain sufficient driving force. For example, in a case where a target vehicle speed is calculated while the vehicle travels at a low speed, an engine revolution corresponding to the target vehicle speed is considerably low. Accordingly, the critical torque is considerably small. Thus, the torque originally generated by the engine is almost entirely cancelled out by braking. In this case, it is impossible to obtain sufficient engine torque. In particular, the insufficiency of engine torque is conspicuous in the case of a vehicle that generates low engine torque, for example, a vehicle with a small displacement engine.

SUMMARY OF THE INVENTION

It is an object of the invention to make it possible to not only suppress wheel slip but also to efficiently transmit an engine torque as a driving force.

A traction control device in accordance with one aspect of the invention includes a wheel speed detecting portion, a vehicle body speed calculating portion, a target slip vehicle speed setting portion, a target torque vehicle speed setting portion, an insufficient acceleration determining portion, and a target vehicle speed setting portion. The wheel speed detecting portion calculates a wheel speed of respective wheels of a vehicle. The vehicle body speed calculating portion calculates a vehicle body speed of the vehicle based on a wheel speed calculated by the wheel speed detection portion. The target slip vehicle speed setting portion sets a target slip vehicle speed serving as a target value for the wheel speed of each of the wheels such that the wheel speed becomes different from the vehicle body speed by a predetermined value. The target torque vehicle speed setting portion sets a target torque vehicle speed serving as a target value for the wheel speed of each of the wheels such that a torque of an engine mounted in the vehicle becomes equal to a predetermined value. The insufficient acceleration determining portion determines whether or not the vehicle is insufficiently accelerated. The target vehicle speed setting portion selectively sets a target value for the wheel speed of each of the wheels of the vehicle as the target slip vehicle speed or the target torque vehicle speed on the basis of a result of a determination made by the insufficient acceleration determining.

As is apparent from the foregoing, the target value for the respective wheel speeds of each of the vehicle is switched between the target slip vehicle speed and the target torque vehicle speed on the basis of the result of the determination made by the insufficient acceleration determining portion. Thus, the vehicle can be prevented from being insufficiently accelerated. Therefore, it becomes possible not only to suppress slipping of the wheels, but also to efficiently transmit an engine torque as a driving force.

In this case, if traction control is not being performed, the target slip vehicle speed can be set as a target value for the wheel speed.

Further, if it is determined that the vehicle is sufficiently accelerated during traction control, the target slip vehicle speed can be set as a target value for the wheel speed.

A value obtained by subtracting a predetermined value from a value set as the target value last time may be compared with the target slip vehicle speed. If the larger value among them is used as the target value set this time, the change of the target value for the wheel speed can be prevented from being an excessively large increase. The wheel speed is thereby able to change smoothly.

On the other hand, if it is determined that the vehicle is insufficiently accelerated during traction control, the target torque vehicle speed may be set as a target value for the wheel speed. In this manner, the engine can operate at a revolution speed that allows sufficient engine torque to be obtained, and the vehicle can be prevented from being insufficiently accelerated.

The larger one of the target slip vehicle speed and the target torque vehicle speed may be compared with a value obtained by adding a predetermined value to a value set as the target value last time. If the smaller one of these values is used as the target value set this time, the change in the target value for the wheel speed can be prevented from becoming an excessively large increase. The wheel speed is thereby able to change smoothly.

BRIEF DESCRIPTION OF THE DRAWINGS

Other objects, features and advantages of the present invention will be understood more fully from the following detailed description made with reference to the accompanying drawings. In the drawings.

DETAILED DESCRIPTION OF THE PREFERRED EMBODIMENTS

Figure 1:
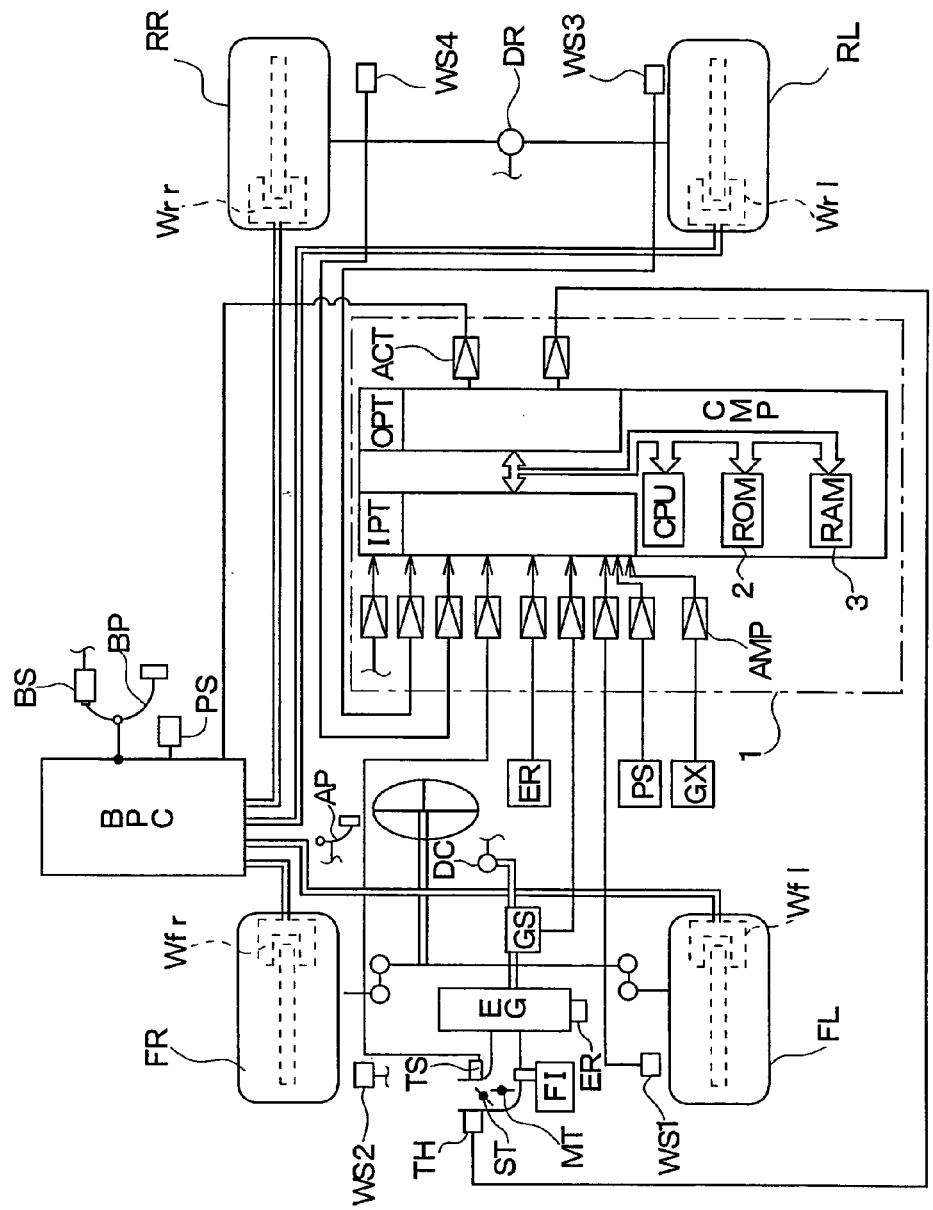
FIG. 1 shows an overall construction of a vehicle control system to which a traction control device in accordance with a first embodiment of the invention is applied.

The present invention will be described further with reference to various embodiments in the drawings.

First Embodiment

FIG. 1 shows an overall construction of a vehicle control system in which a traction control device in accordance with an embodiment of the invention is realized.

As shown in FIG. 1, the vehicle control system includes an engine EG; a transmission GS; a brake fluid pressure control device BPC; wheel cylinders Wfl, Wfr, Wrl and Wrr that are provided for wheels FL, FR, RL and RR respectively; sensors including various types of sensor; a buzzer BZ; and an electronic control unit (hereinafter referred to as "ECU") 1. It is to be noted that FL, FR, RL and RR represent the front-left, front-right, rear-left and rear-right wheels, respectively.

The engine EG is an internal combustion engine provided with a throttle control device TH and a fuel injection device FI. The engine EG is driven in accordance with (i) an operation amount of an accelerator pedal AP that is taken to correspond to a drive-request from a driver, and (ii) an engine control signal from the ECU 1. More specifically, the throttle control device TH controls the opening of a main throttle valve MT in accordance with the operation amount of the accelerator pedal AP, and drives a subsidiary throttle valve ST in accordance with a control signal from the ECU 1 so as to control the opening of the subsidiary throttle valve ST. The fuel injection device FI is driven on the basis of a control signal from the ECU 1 and thereby controls the amount of fuel injection. Accordingly, the engine speed of the engine EG is controlled by driving the throttle control device TH and the fuel injection device FI.

The vehicle illustrated in the present embodiment is a front-engine rear-drive vehicle. This vehicle is constructed such that the engine EG is coupled to the rear wheels RL and RR via the transmission GS, a center differential DC, and a rear differential DR. Accordingly, the front wheels FL and FR are driven wheels, and the rear wheels RL and RR are driving wheels.

The transmission GS shifts between gear positions. A gear position sensor installed in the transmission GS transmits information about the gear position to the ECU 1. Further, the gear position is changed on the basis of a gear position control signal from the ECU 1.

The brake fluid pressure control device BPC adjusts brake fluid pressures (wheel cylinder pressures) applied to the wheel cylinders Wfl, Wfr, Wrl and Wrr of the wheels FL, FR, RL and RR, respectively, in accordance with an operation amount of a brake pedal BP that is depressed in line with a braking-request of the driver, and-with a braking request based on slope vehicle-position hold control performed by the ECU 1. More specifically, the brake fluid pressure control device BPC is equipped with a master cylinder (not shown), and with a pressure sensor PS for detecting an output brake fluid pressure (master cylinder pressure) of the master cylinder. The brake fluid pressure control device BPC is configured such that an output signal from the pressure sensor PS is input to the ECU 1. An actuator, not shown (e.g., a solenoid, or the like), provided in the brake fluid pressure control device BPC is driven on the basis of a brake control signal from the ECU 1, whereby the respective wheel cylinder pressures are adjusted.

The sensors of various types of sensor is configured to include, in addition to the sensors described previously, wheel speed sensors WS1 to WS4; a brake switch sensor BS; a throttle sensor TS; an engine revolution sensor ER; and a tilt sensor GX.

The wheel speed sensors WS1 to WS4 are disposed in the wheels FL, FR, RL and RR respectively. The wheel speed sensors WS1 to WS4 are connected to the ECU 1. Each of the wheel speed sensors WS1 to WS4 outputs to the ECU 1 a pulse signal including pulses of which the number is proportional to a rotational speed of a corresponding one of the wheels FL, FR, RL and RR, namely, a wheel speed.

The brake switch sensor BS detects when the brake pedal BP is depressed by the driver. A detection signal from the brake switch sensor BS is input to the ECU 1.

The throttle sensor TS detects whether the engine EG is in an idling range or in an output range, and detects respective opening amounts of the main throttle valve MT and the subsidiary throttle valve ST. An idling switch signal in the form of an on-off signal that indicates whether the present range is the idling range or the output range, and throttle opening signals that indicate the opening amounts of the throttle valves MT and ST are output from the throttle sensor TS. These signals are output to the ECU 1. Note that, the idling switch signal from the throttle sensor TS is utilized to detect whether or not the accelerator pedal AP is being operated.

The engine revolution sensor ER is designed to detect the engine speed of the engine EG, namely, a value serving as a parameter for engine torque. An engine torque curve corresponding to the engine speed is determined for various types of the engine EG.

The tilt sensor GX corresponds to a tilt angle detecting portion of the present invention for detecting a tilt angle of the vehicle. The tilt sensor GX is provided with a weight that is swingably supported in the longitudinal direction of the vehicle, and outputs a signal Gx indicating a displacement stroke of the weight that results from tilt of the vehicle in the longitudinal direction. This signal Gx is input to the ECU 1. A tilt angle Gr is calculated by the ECU 1 based on the signal Gx.

More specifically, when the vehicle is stopped, the tilt angle Gr of the vehicle in the longitudinal direction is calculated based on the equation, $GR=K \cdot Gx$ (where, K is a constant). If the vehicle then moves, the signal Gx fluctuates in accordance with the acceleration of the vehicle. Thus, the tilt angle Gr is calculated using Equation 1 below:

$$Gr(n) = k \cdot Gr(n-1) + (1-k) \cdot K \cdot (Gx - Gw) \quad \text{Equation (1)}$$

where, $Gr(n)$ represents a current tilt angle, $Gr(n-1)$ represents a tilt angle calculated last time, k represents a weighting factor that is defined to be a value larger than 0 and smaller than 1, and Gw represents an acceleration of the vehicle. The tilt angle Gr is set, for example, to have a positive value when the vehicle is tilted with a rear side thereof directed downwards (i.e., if the vehicle is traveling uphill), and to have a negative value in the opposite case (i.e., if the vehicle is traveling downhill).

The ECU 1 has a microcomputer CMP. The microcomputer CMP is provided with an input port IPT, an output port OPT, a processing unit CPU, a ROM 2 and a RAM 3 that serve as storage units, a control timer (not shown), a counter, and the like. These components are interconnected via a bus.

Output signals from the aforementioned sensors, that is, the wheel speed sensors WS1 to WS4, the brake switch BS, and the like, are input to the processing unit CPU from the input port IPT via an amplification circuit AMP. Control signals are output from the output port OPT to the throttle control device TH and the brake fluid control device BPC, respectively, via a drive circuit ACT.

A program for performing traction control is stored in the ROM 2. The processing unit CPU performs processing in accordance with the program stored in the ROM 2 while an ignition switch (not shown) is on. Variable data required for the execution of the program are temporarily stored in the RAM 3.

Figure 2A:
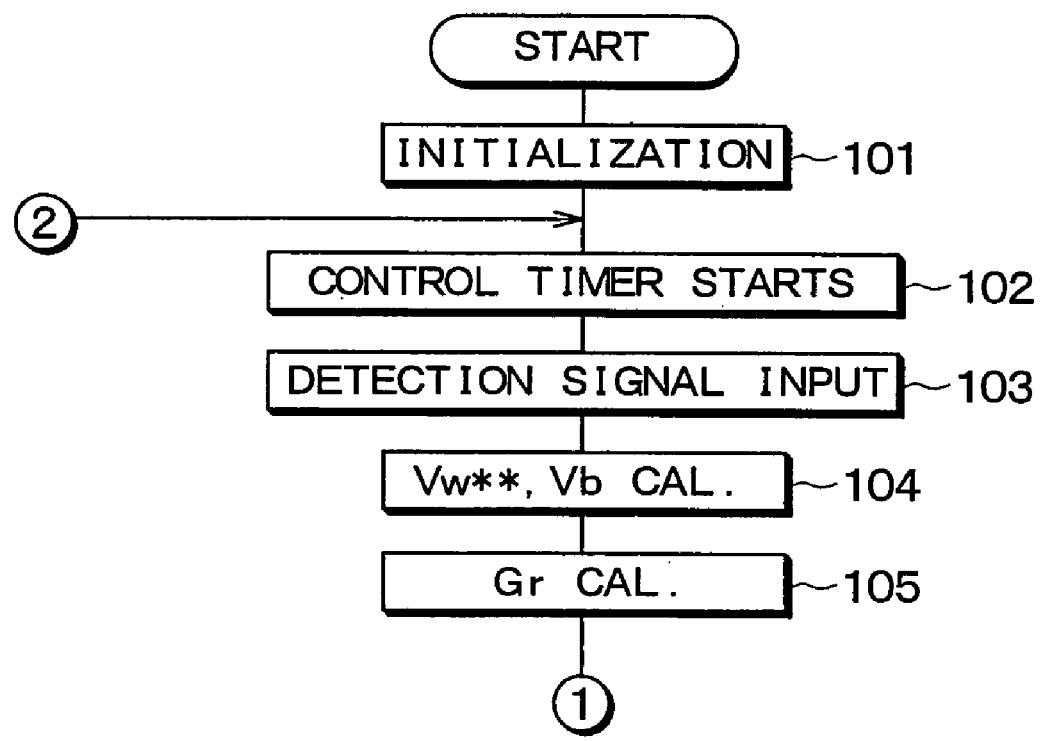
FIG. 2A is a flowchart showing a traction control that is performed by the vehicle control system shown in FIG. 1.
Figure 2B:
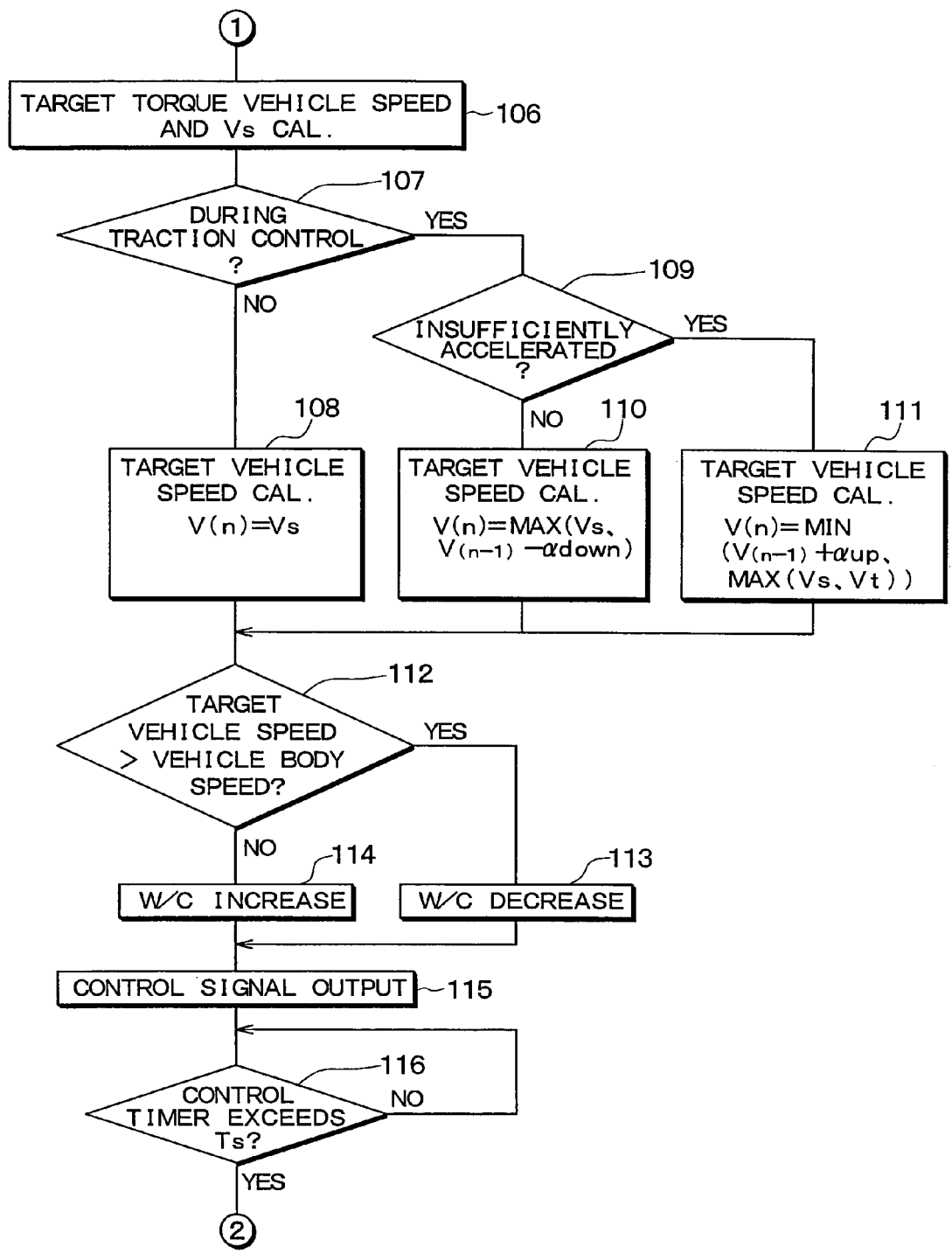
FIG. 2B is a flowchart showing a traction control that continues from that shown in FIG. 2A.

The control system with the above described configuration performs traction control. The ECU 1 performs traction control on the basis of various calculations. The flowcharts in FIGS. 2A and 2B show the details of the processing routines performed by the traction control. Each of the processing routines shown in the flowcharts for the traction control is performed when the ignition switch is turned on such that the microcomputer CMP is activated.

First, at 101, the microcomputer CMP is initialized, and various calculated values stored in the RAM 3 are cleared. Then, at 102, the control timer is cleared, and then starts counting. The control timer mentioned here counts a control period Ts of the traction control. The processing routine starting at 102 is performed every time the control period Ts elapses (refer to the processing at 114).

At 103, the microcomputer CMP reads detection signals from the wheel speed sensors WS1 to WS4, the detection signal from the brake switch sensor BS, the idling switch signal from the throttle sensor TS, the detection signal from the gear position sensor, the detection signal from the engine revolution sensor ER, and the detection signal from the tilt sensor GX.

Then at 104, a wheel speed Vw is calculated ("" indicates a representative one of the wheels FL, FR, RL and RR; thus, the wheel speed Vw represents respective speeds of each of the four wheels FL, FR, RL and RR). Further, a vehicle body speed (estimated vehicle body speed) Vb is calculated on the basis of the wheel speed Vw. Various known methods may be adopted to calculate the vehicle body speed Vb. For instance, one of speeds VWFL and VWFR of the front wheels FL and FR that are the driven wheels may be used as the vehicle body speed Vb.

The routine then proceeds, and, at 105, the tilt angle Gr (which has a positive value when the vehicle is tilted with its rear side directed downwards, and a negative value in the opposite case) is calculated.

Next, at 106, a target slip vehicle speed Vs and a target torque vehicle speed are calculated. The target slip vehicle speed Vs mentioned here corresponds to a value obtained by adding a speed corresponding to a target slip to the current vehicle body speed Vb. That is, a target slip vehicle speed Vs, which is a target value for the wheel speed Vw, is calculated such that a slip rate (which is calculated from a ratio of a difference between the vehicle body speed Vb and the wheel speed Vw and the current vehicle body speed Vb) remains within a predetermined range (i.e., in the neighborhood of 15%).

Figure 3:
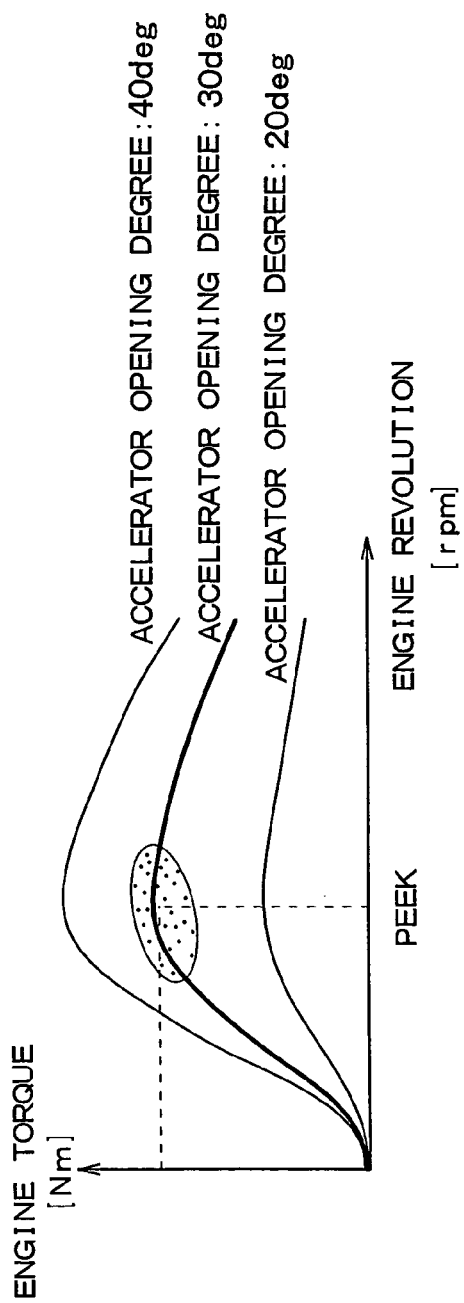
FIG. 3 is a graph showing a correlation between engine revolution and engine torque.

The target torque vehicle speed Vt corresponds to the wheel speed Vw** at the time when sufficient engine torque is obtained. For example, as is apparent from the correlation diagram for the engine speed and engine torque shown in FIG. 3, the peak value of engine torque changes in accordance with the opening degree of the accelerator. However, the engine speed is substantially constant when the engine torque reaches its peak value. Therefore, the target torque vehicle speed Vt is calculated from a tire radius R, a gear ratio Gr, and an engine revolution NEHi at the time when the engine torque reaches its peak value, using Equation 2 shown below:

$$Vt = NEHi \div Gr \times 2\pi R \qquad \text{Equation (2)}$$

Next, the routine proceeds to processing at 107, it is determined whether or not traction control is being performed. This processing is performed in order for all of the four wheels FL, FR, RL and RR. More specifically, in this processing, a traction control start flag is set such that traction control is started on the conditions that (i) the accelerator pedal is being operated and (ii) that the slip rate that has been calculated from the ratio of the difference between the vehicle body speed Vb and the wheel speed Vw** and the vehicle body speed Vb is equal to or larger than the predetermined value. When these conditions are satisfied, it is determined that traction control is being performed. If the result of the determination at 107 is negative, the routine proceeds, and executes the processing described below at 108. On the other hand, if the result of the determination at 107 is affirmative, the routine proceeds, and executes the processing described below at 109.

At 108, a target speed for traction control cessation is calculated. In this case, since traction control is not being performed, the target slip vehicle speed Vs is adopted as a target vehicle speed V(n) ("n" represents the number of calculation repetitions) to be set this time. The target slip vehicle speed Vs is set in a normal running state where traction control or the like is not performed.

On the other hand, it is determined at 109 whether or not the vehicle needs to be accelerated more (hereinafter referred to as "insufficiently accelerated"). In this processing, the determination as to whether or not the vehicle is insufficiently accelerated is made on the basis of an insufficient acceleration determination flag that is set in accordance with an insufficient acceleration determination flowchart, to be described hereinafter. If the insufficient acceleration determination flag has not been set, it is determined that the vehicle is sufficiently accelerated, and the routine proceeds and executes the processing described below at 110. If the insufficient acceleration determination flag has been set, it is determined that the vehicle is insufficiently accelerated, and the routine proceeds and executes the processing described below at 111.

At 110, a target vehicle speed for when the vehicle is sufficiently accelerated during traction control is calculated. More specifically, the larger one of (a) the target slip vehicle speed Vs and (b) a difference between (i) the target vehicle speed V(n−1) set last time and (ii) a maximum permissible value αdown for change in the target vehicle speed is set as the current target vehicle speed V(n). That is, the current target vehicle speed V(n) is expressed as MAX(Vs, V(n−1)−αdown).

The maximum permissible value αdown of the change in target vehicle speed as mentioned here indicates a maximum value by which the target vehicle speed is permitted to change. More specifically, the maximum permissible value is supposed to ensure that the wheel speed Vw will smoothly change from the target vehicle speed V(n−1) set last time to the target vehicle speed V(n) to be set this time. In other words, during traction control, a braking force is generated so as to reduce the wheel speed Vw that is likely to be produced at the engine speed of the engine. Therefore, if the gradient at which the wheel speed Vw is reduced is steep, the wheel speed Vw is not changed smoothly. To avoid this occurring, the maximum value of the gradient with which the wheel speed Vw** is reduced is limited to the maximum permissible value αdown. The maximum permissible value αdown of the change in target vehicle speed is set, for example, in accordance with the target vehicle speed V(n−1) set last time.

Thus, if the vehicle is sufficiently accelerated, usually, the target slip vehicle speed Vs is adopted as the target vehicle speed V(n) to be set this time, as is the case for traction control cessation. In the case where direct adoption of the target slip vehicle speed Vs does not ensure a smooth change in the target vehicle speed, the difference between the target vehicle speed V(n−1) set last time and the maximum permissible value αdown for the change in target vehicle speed is adopted as the target vehicle speed V(n).

On the other hand, at 111, a target vehicle speed for the case where the vehicle is insufficiently accelerated during traction control is calculated. More specifically, MIN(V(n−1)+αup, MAX(Vs, Vt)) is set as the current target vehicle speed V(n). More particularly, after the larger one of the target slip vehicle speed Vs and the target torque vehicle speed Vt has been selected, the smaller value one of (a) the selected speed value and (b) the sum of the target vehicle speed V(n−1) set last time and a maximum permissible value αup for the change in target vehicle speed is set as the current target vehicle speed V(n).

The maximum permissible value αup of the change in target vehicle speed as mentioned here indicates a maximum value that is permitted as a change in target vehicle speed, namely, a maximum permissible value that is supposed to ensure that the wheel speed Vw will smoothly change from the target vehicle speed V(n−1) set last time to the target vehicle speed V(n) to be set this time. That is, if setting is executed based on the target torque vehicle speed Vt following a switch from the target slip vehicle speed Vs, the wheel speed Vw increases during traction control is performed. Therefore, if the gradient with which the wheel speed Vw increases is steep, the wheel speed Vw is not changed smoothly. To avoid this occurring, the maximum value of the gradient with which the wheel speed Vw** increases is limited to the maximum permissible value αup. The maximum permissible-value αup for the change in the target vehicle speed is may also be set, for example, in accordance with the target vehicle speed V(n−1).

The target slip vehicle speed Vs is, generally speaking, lower than the target torque vehicle speed Vt. However, since the target slip vehicle speed Vs is set in accordance with the speed of the vehicle, it is conceivable that the target slip vehicle speed Vs will be higher than the target torque vehicle speed Vt when the vehicle is traveling at certain speeds.

Thus, fundamentally, if the vehicle is insufficiently accelerated, the target torque vehicle speed Vt is adopted as the target vehicle speed V(n) to be set this time, unlike the case for traction control cessation. If the target slip vehicle speed Vs is higher than the target torque vehicle speed Vt, the target slip vehicle speed Vs is adopted as the target vehicle speed V(n) to be set this time. Furthermore, in the case where direct adoption of the target torque vehicle speed Vt or the target slip vehicle speed Vs will not ensure a smooth change in target vehicle speed, the difference between the target vehicle speed V(n−1) set last time and the maximum permissible value αup for the change in the target vehicle speed is adopted as the target vehicle speed V(n).

Once the target vehicle speed V(n) to be set this time is determined in the above described manner, the routine proceeds to processing at 112, determines whether or not the target vehicle speed V(n) is higher than the current vehicle body speed Vb. If the result of the determination at 112 is affirmative, the routine proceeds to processing at 113, a W/C pressure is set to decrease so that the vehicle body speed Vb increases and approaches the target vehicle speed V(n). If the result of the determination at 112 is negative, the routine proceeds to processing at 114, the W/C pressure is set to increases so that the vehicle body speed Vb decreases and approaches the target vehicle speed V(n).

After the W/C pressure is set to increase or decrease in this manner, the routine proceeds to processing at 115, the following processing is executed: the ECU 1 transmits a control signal that accords with the previously set information to the brake fluid pressure control device BP, whereby an actuator (not shown) installed in the brake fluid pressure control device BPC is driven. Thus, the W/C pressure is reduced or increased.

After this processing has been terminated, it is determined at 116 whether or not the count value of the control timer in the microcomputer CMP has exceeded the control period Ts. If the count value has exceeded the control period Ts, the routine returns to processing 102. Then, the routine repeats, starting from the processing at 102.

Figure 4:
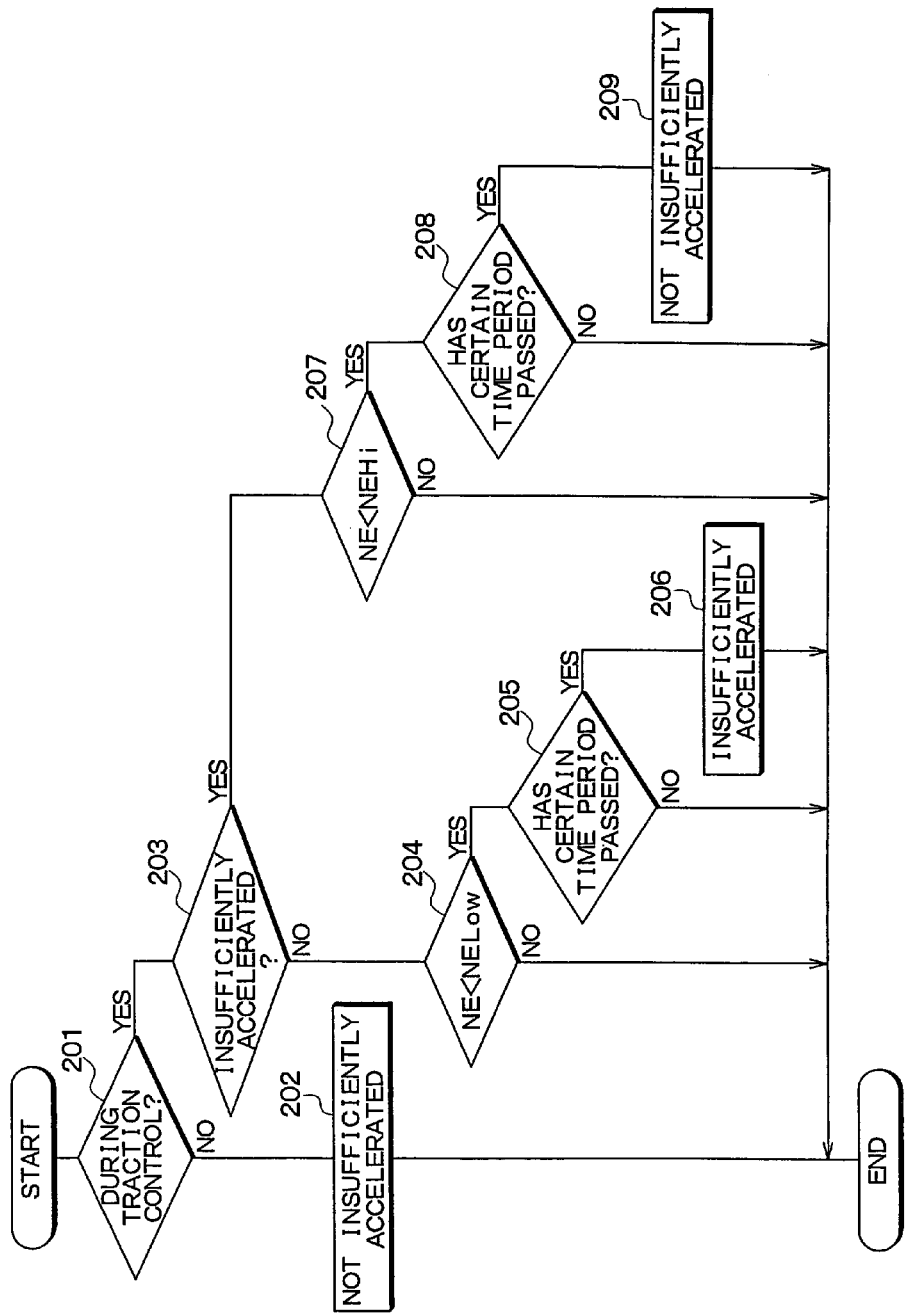
FIG. 4 is a flowchart showing an insufficient acceleration determination process that is performed by the vehicle control system shown in FIG. 1 as a timer interruption process.

Next, an insufficient acceleration determination process will be described with reference to a flowchart shown in FIG. 4.

The ECU 1 performs the insufficient acceleration determination process at predetermined time intervals as a timer interruption process.

First, it is determined at 201 whether or not the traction control is being performed. The determination in this processing is executed based on whether or not the traction control start flag (that is set at 106 in FIG. 2A) has been set. If the traction control start flag has not been set, it is determined that traction control is not being performed and that the vehicle is sufficiently accelerated. The routine then proceeds to processing at 202, the insufficient acceleration determination flag is reset in order to indicate that the vehicle is sufficiently accelerated.

Further, if it is determined at 201 that the traction control is being performed because the traction control start flag has been set, the routine proceeds to processing at 203, determines whether or not the vehicle is insufficiently accelerated. The determination in this processing is based on whether or not the insufficient acceleration determination flag has been set. For example, if the determination at 203 is being executed for the first time since setting of the traction control start flag, the insufficient acceleration flag is not set. Therefore, it is determined that the vehicle is sufficiently accelerated. If the insufficient acceleration determination flag is set at 209 (as will be described later) because the insufficient acceleration determination process has already been performed several times, it is determined that the vehicle is insufficiently accelerated.

If the result of the determination at 203 is negative, the routine proceeds to processing at 204, determines whether or not the engine revolution NE (read at 103 in FIG. 2A) is lower than a predetermined revolution NELow. The predetermined revolution NELow is calculated based on a torque necessary for moving the vehicle and a correction torque corresponding to braking energy. The torque necessary for moving the vehicle indicates the torque that is necessary to accelerate the vehicle to which the vehicle control system of the present embodiment is applied. This torque is set on the basis of a weight of the vehicle and a road surface tilt angle Gr. The correction torque indicates a correction factor that is used if braking force is generated by the brake fluid pressure control device BPC. The correction torque is only used if braking force is generated.

If the result of the determination at 204 is negative, it is determined that the vehicle is sufficiently accelerated, and the process is terminated immediately. In this case, the insufficient acceleration determination flag remains is the reset state.

If the result of the determination at 204 is affirmative, the counter of the ECU 1 starts counting so as to measure how much time has elapsed since the engine revolution NE dropped below the predetermined revolution NELow. Then, the routine proceeds to processing at 205, determines whether or not the count value of the counter has exceeded a value indicating a certain time period. If the result of the determination at 205 is negative, it is determined that the vehicle is still sufficiently accelerated, and the process is terminated immediately. If the result of the determination at 205 is affirmative, the routine proceeds to processing at 206, it is determined that the vehicle is insufficiently accelerated. Accordingly, the insufficient acceleration determination flag indicating an insufficiently accelerated state of the vehicle is set, and the count value of the counter is reset and the process terminated.

On the other hand, if the result of the determination at 203 is affirmative, the routine proceeds, and, at 207, determines whether or not the engine revolution NE (read at 103 in FIG. 2A) is higher than a predetermined revolution (a first predetermined revolution) NEHi. The predetermined revolution NEHi indicates an engine revolution that ensures that a torque is generated that is equal to or larger than the torque necessary for moving the vehicle. If the result of the determination at 207 is negative, it is determined that the vehicle is still insufficiently accelerated, and the process is terminated immediately. In this case, the insufficient acceleration determination flag remains set.

If the result of the determination at 207 is affirmative, the counter in the ECU 1 starts counting so as to measure how much time has elapsed since the engine revolution NE rose above a predetermined revolution (a second predetermined revolution) that is higher than the predetermined revolution NELow. Then, the routine proceeds to processing at 208, it is determined whether or not the count value of the counter has exceeded a value that indicates a certain period. If the result of the determination at 208 is negative, it is determined that the vehicle has not recovered from the insufficient acceleration state, and the process is terminated immediately. If the result of the determination at 208 is affirmative, the routine proceeds to processing at 209, it is determined that the vehicle has recovered from the insufficient acceleration state. Thus, the insufficient acceleration determination flag is reset, and the count value of the counter is reset and the process is terminated.

Figure 5:
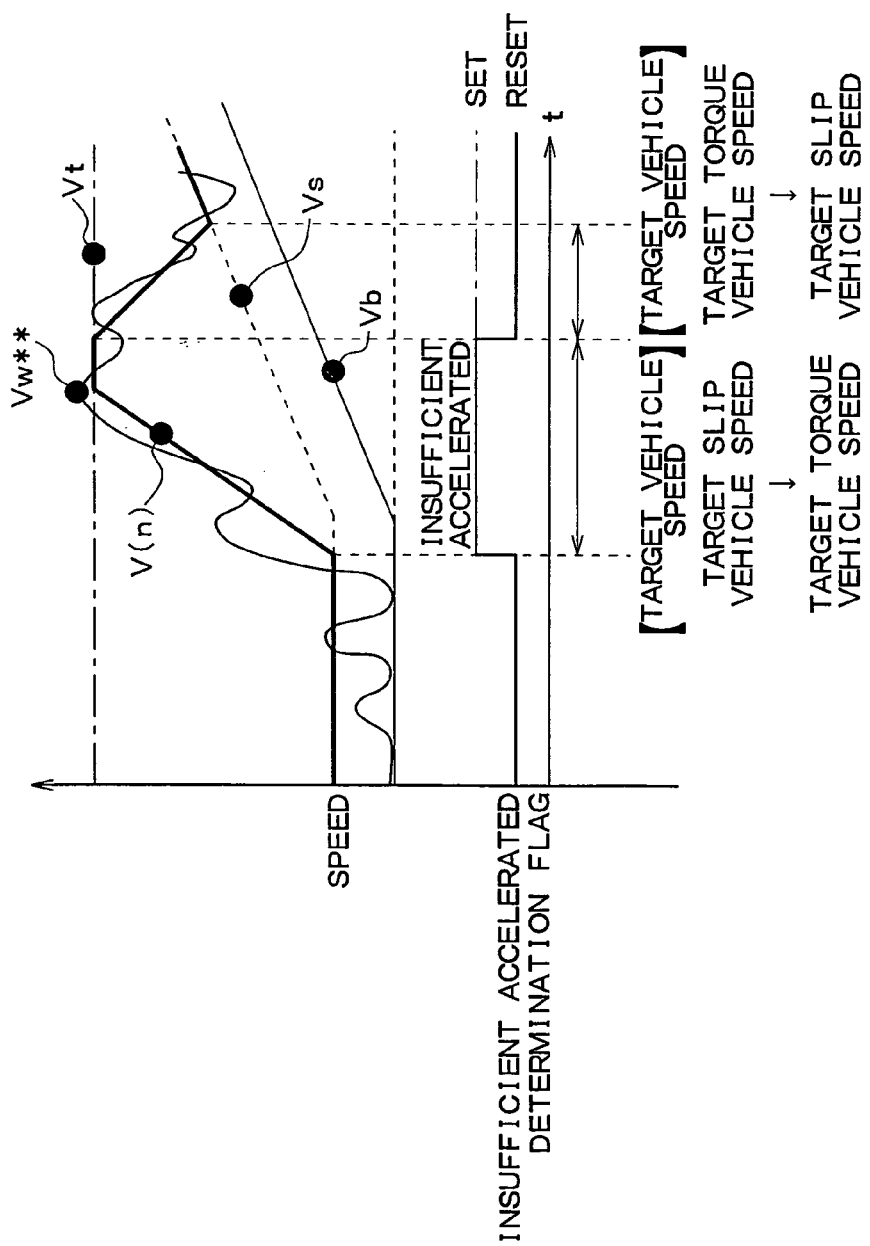
FIG. 5 is a time chart showing various speeds and the state of an insufficient acceleration determination flag in a case where traction control is performed.

The traction control is performed on the basis of the processing described above. FIG. 5 shows an example of a time chart for the case where the traction control is performed as described above.

As shown in FIG. 5, if the target slip vehicle speed Vs is set for the vehicle body speed Vb, the target slip vehicle speed Vs is adopted as the target vehicle speed V(n). Therefore, the wheel speed Vw** of each of the wheels FL, FR, RL and RR is controlled so as to equal the target slip vehicle speed Vs.

If the insufficient acceleration determination flag is then set because it has been determined that the vehicle is insufficiently accelerated, the target vehicle speed V(n) is switched from the target slip vehicle speed Vs to the target torque vehicle speed Vt. The wheel speed Vw** of each of the wheels FL, FR, RL and RR is controlled to become equal to the target torque vehicle speed Vt, which is higher than the target slip vehicle speed Vs. Accordingly, a large engine torque can be obtained, and the insufficiently accelerated state of the vehicle can be eliminated.

If the insufficiently accelerated state of the vehicle is then eliminated, the insufficient acceleration determination flag is reset, and the target vehicle speed V(n) is switched again from the target torque vehicle speed Vt to the target slip vehicle speed Vs. The wheel speed Vw** of each of the wheels FL, FR, RL and RR is thus controlled once again so as to become equal to the target slip vehicle speed Vs.

As described above, according to the vehicle control system of the present embodiment, the target vehicle speed V(n) is made equal to the target slip vehicle speed Vs unless the vehicle is insufficiently accelerated. The wheel speed Vw** of each of the wheels is thereby controlled so as to suppress, as far as possible, slipping of the wheels FL, FR, RL and RR.

Moreover, if insufficient acceleration of the vehicle is detected, the target vehicle speed V(n) is made equal to the target torque vehicle speed Vt. The wheel speed Vw** of each of the wheels FL, FR, RL and RR is thus controlled such that the engine torque necessary for accelerating the vehicle can be obtained.

Further, since the target torque vehicle speed Vt is higher than the target slip vehicle speed Vs in this case, the wheels FL, FR, RL and RR are likely to slip. However, the vehicle is braked such that the wheel speed Vw of each of the wheels FL, FR, RL and RR becomes equal to the target torque vehicle speed Vt instead of increasing without limit. Note that, it is possible that if one of the driving wheels were to loose contact with the road surface, it would rotate idly without being checked, thus causing the torque generated by the other driving wheel remaining in contact with the road surface to be insufficient. However, according to the present invention, the wheel speed Vw of each of the wheels FL, FR, RL and RR is controlled to become equal to at least the target torque vehicle speed Vt. Accordingly, sufficient torque can be generated by the driving wheel that is in contact with the road surface.

As described hitherto, the wheel speed Vw** is selectively caused to track the target slip vehicle speed Vs or the target torque vehicle speed Vt in accordance with the insufficiently accelerated state of the vehicle. This makes it possible to both suppress slipping of the wheels FL, FR, RL and RR and efficiently transmit the engine torque as a driving force. Accordingly, a sufficiently large torque can be obtained. Moreover, even a vehicle originally designed to generate low engine torque, for example, a vehicle with a small displacement engine, can be accelerated sufficiently.

With the vehicle control system of the present embodiment, during a switch from the target slip vehicle speed Vs to the target torque vehicle speed Vt, the maximum permissible values αup and αdown for the change in target vehicle speed are set as values that are not exceeded. Therefore, the change in the target vehicle speed can be prevented from increasing excessively, and the switch from the target slip vehicle speed Vs to the target torque vehicle speed Vt can be executed smoothly.

Other Embodiments

In the aforementioned first embodiment, if the engine revolution remains equal to the predetermined revolution NEHi for a certain period, it is determined that the vehicle has recovered from the insufficient acceleration state (at 207 to 209). However, it is also possible to execute determination concerning the recovery from the insufficient acceleration state using another parameter that enables detection of whether or not acceleration is sufficient. For example, it may be determined that the vehicle has recovered from insufficient acceleration based on whether the vehicle body speed Vb has become equal to or higher than a certain vehicle speed.

Further, if the engine revolution NE remains below the predetermined revolution NELow for a certain period or more, it is determined that the vehicle is insufficiently accelerated (see 204 to 206). Here, as well, it is possible to execute determination concerning the recovery from the insufficient acceleration state using another parameter that enables the detection of a failure to reach sufficient acceleration. For example, the determination concerning insufficient acceleration may also be executed by determining a reference acceleration in advance using a gear position and the engine revolution NE, and comparing the reference acceleration with an actually obtained acceleration.

It should be noted that the numbers shown in the flowcharts correspond to portions for performing the respective processing operations described above.

While the above description is of the preferred embodiments of the present invention, it should be appreciated that the invention may be modified, altered, or varied without deviating from the scope and fair meaning of the following claims.

What is claimed is:

1. A traction control device for efficiently transmitting a torque generated by an engine, the traction control device comprising:
    an interface receiving signals from a sensor assembly and a plurality of wheel speed sensors, and outputting control signals to the engine and a brake fluid pressure control device; and
    a processor coupled to the interface, the processor executing a program stored in a storage unit, the processor configured to:
        calculate a wheel speed of respective wheels of a vehicle based upon the signals received from the sensor assembly and the plurality of wheel speed sensors;
        calculate a vehicle body speed of the vehicle based on the wheel speed;
        set a target slip vehicle speed serving as a target value for the wheel speed of each of the wheels such that the wheel speed of each of the wheels becomes different from the vehicle body speed by a predetermined range;
        set a target torque vehicle speed serving as a target value for the wheel speed of each of the wheels such that a torque of an engine mounted in the vehicle becomes equal to a predetermined value;
        determine whether or not the vehicle is insufficiently accelerated; and
        set the target slip vehicle speed to a target value for the wheel speed of each of the wheels of the vehicle when the vehicle is not insufficiently accelerated, and set the target torque vehicle speed as the target value for the wheel speed when the vehicle is insufficiently accelerated.

* * * * *